Patented May 19, 1942

2,283,236

UNITED STATES PATENT OFFICE 2,283,236

SULPHONATED DERIVATIVES OF POLYMERIZED METHYLSTYRENE

Frank J. Soday, Upper Darby, Pa., assignor to The United Gas Improvement Company, a corporation of Pennsylvania No Drawing. Application June 23, 1939, Serial No. 280,726

18 Claims. (Cl. 260—505)

This invention relates to certain novel chemical compounds, methods for their preparation and uses.

In general, this invention relates to sulphonated derivatives of polymethylstyrenes and to a method for their preparation.

More particularly, this invention relates to sulphonates of polymerized para, meta and ortho methylstyrene; methods for the preparation of these sulphonates, their properties and uses.

Ortho, meta and para methyl styrenes are found in many source materials, such for example as light oil and condensate fractions obtained in the manufacture of artificial gas.

In the various processes for the manufacture of artificial gas such as oil gas, carburetted water gas, or coal gas, considerable quantities of tar are produced, and the gas contains substantial quantities of other readily condensible materials. Both the condensates obtained from the artificial gas, and the light oil obtained upon distillation of the tar, are sources for many aromatic hydrocarbons. Such a material may therefore be conveniently designated as an aromatic light oil. The unsaturated aromatic hydrocarbons include, among other things, the ortho, meta and para methyl-substituted styrenes.

The methyl-substituted styrenes have the following general structural formulae.

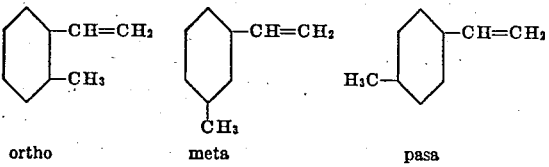

ortho   meta   para

Because of their unsaturated character, these materials polymerize readily, even to an appreciable extent at room temperature.

These isomeric methylstyrenes may be obtained, among other ways, by the fractional distillation of aromatic light oils obtained from the above mentioned tars and condensates.

Fractions containing any desired concentration of ortho, meta, or para methyl styrene may be obtained depending upon the conditions of fractionation.

For example, a fraction containing approximately 58.0% by weight of paramethylstyrene was obtained by distillation of a light oil, this fraction having the following physical properties:

5% boiling point=169.2° C. at 760 mm.
50% boiling point=170.0° C. at 760 mm.
90% boiling point=172.5° C. at 760 mm.
Density (D 20/4)=0.8940
Refractive index (N 20/D)=1.5240

Another fraction containing 63.90% of unsaturated hydrocarbons, primarily metamethylstyrene, was obtained in the same distilling process. This fraction had the following physical properties:

5% boiling point=172.5° C. at 760 mm.
50% boiling point=174.0° C. at 760 mm.
90% boiling point=176.3° C. at 760 mm.
Density (D 20/4)=0.9145
Refractive index (N 20/D)=1.5321

The unsaturated nature of the methyl-substituted styrenes makes possible polymerization of these compounds into many different types of polymers.

These polymers are, for the most part, resinous materials of relatively high molecular weight. The nature of the polymer prepared depends, among other things, upon the methyl-substituted styrene employed, the rate of polymerization, the nature of the polymerization (heat or catalytic), and the concentration of the monomeric materials in the fraction polymerized.

For example, tough, high-melting polymers of very high molecular weight are prepared by polymerization of methyl styrenes in the absence of catalysts at room temperatures. Polymerization under these conditions is a very slow process, however, and may be accelerated by an increase in the polymerization temperature employed.

A polymer obtained by the polymerization of methyl styrene fractions at a temperature of 200° C. is rather brittle, has a fairly low melting point, and its molecular weight is considerably lower than the molecular weight of the corresponding polymer formed at room temperature.

It will thus be apparent that polymethylstyrenes of varying physical properties may be prepared by a proper choice of polymerizing temperatures.

Polymerization of methylstyrenes may also be effected by other suitable methods, such as catalytic polymerization. Suitable catalysts for this purpose include, among others, the metallic halides or metallic halide-organic solvent complexes, such as, for example, boron trifluoride or boron trifluoride-organic solvent complexes.

Although the structure of various polymers of methyl styrenes may vary with each new type of polymer, in general those polymers obtained by the non-catalytic polymerization of the methylstyrenes at relatively low temperatures may be considered to be linear molecules. That is, the resinous polymer molecules or aggregates are composed of a large number of units which are attached to each other in a similar manner.

For example, polymethylstyrene prepared by the polymerization of para methyl styrene at low temperatures may be considered to have the following general structure:

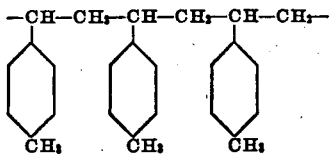

The polymers prepared from ortho methyl styrene and meta methyl styrene may be regarded as having the same general structure, with the exception that the methyl groups occupy positions on the benzene nucleus corresponding to the positions of these groups in the respective monomeric compounds.

Polymers prepared at more elevated temperatures, or by the use of catalysts, may be regarded as having a branched-chain structure.

I have found that sulphonated derivatives of polymerized methyl styrenes form a large class of valuable products.

The sulphonated derivatives may be either the acid sulphonates or their salts.

In general, it may be said that the sulphonation of polymerized methylstyrenes takes place upon the aromatic nuclei of the respective polymers. Two positions on each benzene nucleus of a methylstyrene polymer are occupied by the methyl group and the styrene group. It is thus apparent that there may be effected sulphonation of one, two, three or four positions of each of the aromatic nuclei in the methyl styrene polymer. It is understood, however, that every aromatic nucleus need not be sulphonated, or if each is sulphonated, sulphonation need not be to the same extent on each nucleus.

Illustrative of the sulphonated derivatives of polymethylstyrenes embraced by this invention may be given, among others, the following structural formulae.

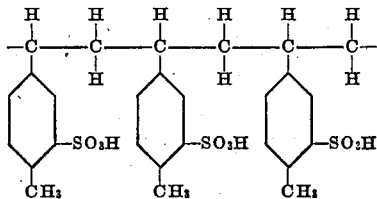

Acid sulphonate of polymerized para methyl styrene.

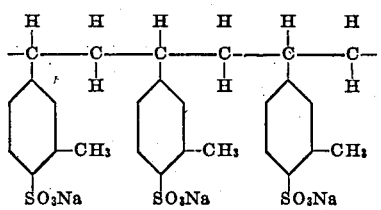

Sodium sulphonate of polymerized meta methyl styrene.

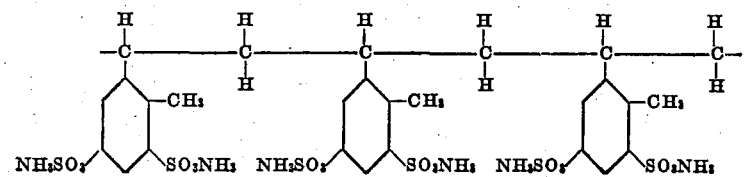

Ammonium disulphonate of polymerized ortho methyl styrene.

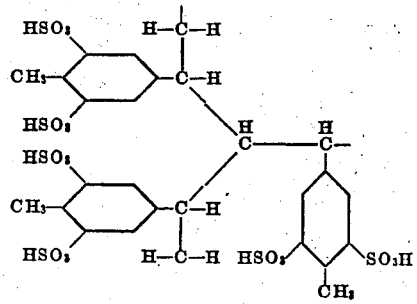

Acid disulphonate of a branched chain polymer of a para methyl styrene.

The structures shown above should be considered as representative only, as the sulphonated product may have one to four sulphonate radicals on each of the sulphonated aromatic rings in the polymer, it being understood that all aromatic rings need not be sulphonated, the sulphonate radicals may be acid sulphonates or their salts, the polymers may be linear or branched chain polymers, the methylstyrenes may be ortho, meta or para methyl styrenes or mixtures thereof, and the polymers may be composed of any number of monomeric molecules of ortho, meta and/or para methyl styrene.

It will be apparent that a large number of sulphonated polymethylstyrenes may be prepared depending upon the materials employed and the method of preparation.

The properties of sulphonated derivatives of polymerized methyl styrene vary widely depending upon the structure of the compound.

Sulphonated derivatives of polymethylstyrene may be either water soluble or water dispersable, depending primarily upon the molecular weight and structure of the polymer used in the process, the number of sulphonate radicals introduced into the molecule and the nature of the sulphonate radical.

In general, the solubility of the sulphonated products decrease with increase in molecular weight of the polymer used in the process.

Likewise, in general, the solubility of the sulphonated material will be found to decrease with a decrease in the number of substituted sulphonate radicals on the molecule.

Likewise, in general, the solubility of the sulphonate salts of polymers of methyl-substituted styrenes vary with the nature of the salts, as illustrated by the fact that the solubility of the alkali metal salts in water exceed the solubility of the alkaline earth metal salts. The organic alkali derivatives vary in their solubility in water, depending upon the nature and length of the chain attached to the sulphonate radical. In general, they are comparatively water insoluble.

Solubility of the sulphonated derivatives of polymethylstyrenes in solvents other than water, will likewise vary with the structure of the derivatives.

The color, specific gravity, acid number, and many other physical and chemical properties of the sulphonated polymethylstyrenes may be varied as desired through variation in the materials employed and the processes utilized to prepare the sulphonated derivatives.

In general, the sulphonated derivatives of polymethylstyrene may be prepared by the action of a sulphonating agent upon the respective polymerized methyl styrenes or upon mixtures of such polymers.

The acid sulphonates may be prepared, in general, by the use of sulphuric acids, or other sulphur-containing acids, such as chlorosulphonic acid and the like.

The salts of the acid sulphonates of polymethylstyrene may be prepared by reacting the acid sulphonate with alkalies or bases. As representative of the alkalies or bases which may be utilized to prepare the sulphonate salts, may be mentioned, among others, the alkali metal hydroxides or oxides, such as, for example, sodium hydroxide, sodium carbonate, or potassium hydroxide, the alkaline earth metal hydroxides or oxides, as for example calcium hydroxide, barium hydroxide, or magnesium hydroxide, the organic alkalies, such as, for example, trimethyl amine, ethanol amine, and quartenary ammonium bases, and various miscellaneous alkalies, as, for example, ammonia.

In the preparation of the acid sulphonates of the polymethylstyrenes, acids of any desired concentration may be used in the process. Although the use of fuming or concentrated acid is preferable due to the ease with which the sulphonation may be carried out with these reagents, dilute acids may also be used if desired.

In general, it may be said that the use of fuming acid results in a more complete sulphonation of the polymer.

The number of sulphonate radicals introduced into the resin molecule may be controlled to a certain extent, among other ways, by regulating the ratio of sulphonating agent to polymer used in the process. The use of a relatively small amount of sulphonating agent in the process results in the production of a sulphonated derivative containing one sulphonate radical on each of the benzene rings present in the molecule, or even a derivative in which less than all of the benzene rings in the molecule contain sulphonate groups.

On the other hand, the use of excessive quantities of sulphonating agents will produce materials containing two to four sulphonate radicals on each of the benzene rings in the resin molecule.

Sulphonation of methyl styrene polymers may be effected at any desired reaction temperature depending upon the type of product desired. In general, the use of high ratios of concentrated or fuming sulphonating agents at temperatures in excess of 100 to 150° C. may result to some extent in decomposition of a portion of the resin molecule, although such a procedure, generally speaking, effects the addition of the maximum number of sulphonate radicals to the polymer.

If partial decomposition of the resin molecule is undesired, sulphonation temperatures below 100° C. are in general preferable. Lower reaction temperatures have been found to produce, for the most part, lighter colored products.

Direct treatment of the polymerized methyl styrene with the sulphonating agent has been found suitable in the production of sulphonated derivatives of polymethylstyrene. However, a preferred method to effect the sulphonation utilizes solvents for the polymer. Any desired solvents may be used, provided that the polymer is sufficiently soluble therein to form a solution of the desired concentration. Generally, the solvents should be relatively inert to the sulphonating agent employed. Among other solvents which have been found to be suitable for the sulphonation of polymethylstyrene may be mentioned chloroform, ethylene dichloride, and carbon tetrachloride.

Although sulphonation of polymethylstyrene may be effected at ordinary pressures, superatmospheric pressures may be utilized if desired. In general, it may be said that elevated pressures are more suitable when sulphonating agents of low concentration or of only moderate reactivity are employed.

When it is desired to prepare the sulphonate salts of the polymethylstyrenes, the acid sulphonates may be reacted with alkali or alkaline earth metal hydroxides or oxides, organic alkalies and the like, in any desired manner.

Generally speaking, the alkali sulphonates may be prepared by dispersing or dissolving an acid sulphonate of polymethylstyrene in the desired alkali, in the presence of water or an organic solvent, and agitating and/or heating the mixture until the reaction has been completed.

Acidic, neutral, or basic sulphonated derivatives of polymethylstyrene may be prepared by a suitable variation in the ratio of acid sulphonates of polymethylstyrenes and alkali which are permitted to react. For example, a neutral sulphonated derivative of polymethylstyrene may be prepared by reacting together theoretical quantities of alkali and an acid sulphonate of polymethylstyrene, the quantity of alkali having been computed upon the basis of the quantity of acid sulphonate radical contained in the sulphonated polymethylstyrene.

In order to insure relatively homogeneous mixtures and to insure production of sulphonated derivatives of uniform composition, the reactants should, generally speaking, be thoroughly agitated during the reaction process.

The sulphonation reaction may, if desired, be suitably carried out in batch, semi-continuous, or continuous processes, and the reactance may be combined in concurrent or countercurrent manner.

Illustrative of the method of preparing various sulphonated derivatives of polymethylstyrene, the following examples are given.

*Example I*

A paramethylstyrene fraction, obtained by the distillation of light oil from oil gas manufacture, and having the following physical properties:

Initial boiling point = 169.7° C. at 760 mm.
50% boiling point = 170.9° C. at 760 mm.
Final boiling point = 172.2° C. at 760 mm.
Density (D 20/4) = 0.8940.
Refractive index = 1.5240.

was polymerized by heating in a sealed vessel in an atmosphere of nitrogen for a period of four days at a temperature of approximately 145° C. There was obtained a paramethylstyrene polymer, in 70.6% yield, having a melting point of 59–143° C. (by the capillary melting point method) and having the properties of a brittle, colorless, glassy resin.

This para methylstyrene polymer was dissolved in ten parts (ten times its volume) of carbon tetrachloride and the solution was heated to 60° C. Five parts by volume of fuming sulphuric acid was then slowly added to the solution while its temperature was maintained at approximately 60° C. After the addition was completed, the mixture was poured on cracked ice. The resulting product was isolated in the form of a powder by the usual drying procedure.

The sulphonated derivative of polymerized paramethyl styrene thus produced was found to contain from one to two sulphonate radicals for each benzene ring in the molecule. It was readily soluble in water and could be readily converted into corresponding sulphonate salts by treatment with the desired inorganic or organic alkali or base.

Example II

A paramethylstyrene fraction obtained by the distillation of light oil from oil gas manufacture, and having the following physical properties Initial boiling point=169.5° C. at 760 mm.
50% boiling point=170.4° C. at 760 mm.
Final boiling point=171.3° C. at 760 mm.
Density (D 20/4)=0.8940
Refractive index=1.5240 was polymerized by heating in a sealed container in an inert atmosphere for a period of ten days at a temperature of 100° C. A 52.8% yield of a tough, colorless transparent resin with a melting point of 69–163° C., by the capillary melting tube method, was obtained.

A portion of this polymer of paramethylstyrene was dissolved in ten parts by volume of carbon tetrachloride, the solution was heated to 60° C., and five parts by volume of ten per cent fuming sulphuric acid was slowly added thereto. After the completion of the addition, the mixture was poured on cracked ice. There was obtained a sulphonated derivative of polymerized paramethylstyrene, only slightly soluble in cold water, almost water-white in color, and quite sticky in nature. This acid sulphonate was washed as thoroughly as possible with cold water and separated.

By dehydration of the sulphonated polymethylstyrene thus obtained there was secured a water-white solid product.

The water-white solid acid sulphonate of polymerized paramethylstyrene thus prepared was dissolved in hot water to form a clear solution of about 10% concentration. The solution was then neutralized with sodium hydroxide to give an 8% solution of the sodium salt of sulphonated polymethylstyrene.

The sodium salt thus prepared was found to be soluble in either cold or lukewarm water, although prepared from an acid sulphonate which had been insoluble in cold water.

Example III

A paramethylstyrene fraction obtained by the distillation of light oil from oil gas manufacture, and having the following physical properties:

Initial boiling point=170.0° C. at 760 mm.
50% boiling point=170.7° C. at 760 mm.
Final boiling point=171.4° C. at 760 mm.

was polymerized by heating in a sealed container in the presence of an inert atmosphere for a period of ten days at a temperature of 100° C. A 51.6% yield of a tough, colorless, transparent resin with a melting point of 69–163° C. by the capillary melting tube method was obtained.

The paramethylstyrene polymer thus obtained was dissolved in ten parts by volume of chloroform and cooled to −10° C. in a bath of dry ice and acetone. To one hundred parts of the solution thus obtained, six parts of chlorosulphonic acid were slowly added with constant agitation. After the addition of the acid had been completed, the solution was allowed to warm slowly to room temperature and poured on cracked ice. The acid sulphonate of polymerized paramethyl styrene thus obtained was a rubber-like mass that showed very little tendency to dissolve in water.

A portion of this acid sulphonate of polymethylstyrene was added to boiling water and sodium carbonate slowly added until a quantity sufficient to neutralize the acid radicals had been added thereto. The sodium sulphonate derivatives thus prepared, when added to water formed a clear viscous soapy solution therein.

The sulphonated derivatives of polymerized methyl styrene have many interesting industrial applications.

Among other things, they may be used as detergents, wetting agents, penetrants, and foaming agents.

A use to which many of the sulphonated derivatives of polymerized methyl styrene are particularly adapted, is as auxiliary agents for textiles.

It has been found that the soluble sulphonated derivatives of polymerized methyl styrene are of particular value as textile assistants or sizes where it is desired to impart a certain amount of rigidity or "body" to the textile fibre or thread previous to the spinning or weaving operations. Because of the solubility of these sulphonated derivatives, they may be removed after the spinning or weaving operations, when desired, merely by the addition of water.

The relatively insoluble sulphonated polymethyl styrenes may be utilized as textile assistants, sizes or protective agents in those processes where it is desired to impart body, texture, flame-proofing, solvent-resistance, or water-repelling properties to the finished fabric or woven article. When the insoluble sulphonated derivatives are utilized in such processes, they become an integral part of the finished cloth or fabric, due to their insoluble nature, as well as to certain other of their properties.

Generally speaking, the alkaline earth metal sulphonates and the organic alkali sulphonate salts of the polymethylstyrenes may be said to be relatively insoluble, while the alkali metal salts and the acid sulphonates may be considered relatively soluble.

The polymethylstyrene acid sulphonates and their salts may be formed directly in situ in the presence of the fibres, cloth, or textiles.

This latter procedure is of special value in applications in which a relatively insoluble salt is to be incorporated in a finished cloth or fabric. The fabric may be dipped in an aqueous solution of a water-soluble sulphonated polymethylstyrene, for example, followed by reacting the sulphonated polymethylstyrene on the surface and in the interstices of the fabric with a solution or suspension of the desired alkaline earth hydroxide or oxide or other alkaline material, thereby converting the soluble derivative to an insoluble form and depositing it directly on the fabric. The fabric can then be heated, if desired, in order to volatilize the moisture present, or to insure the completion of the reaction.

Superatmospheric or subatmospheric pressures may be used at any stage of the textile treating process if desired.

This process is also applicable to the preparation of organic alkali derivatives of the sulphonated polymethyl styrenes in situ in the textiles. To this end the textiles which have been impregnated with a sulphonated polymethylstyrene may be contacted with the desired organic alkali.

Sulphonated polymethylstyrenes which are water-insoluble, but soluble in certain organic solvents, may also be used in the above textile treating process. In this case the textile may be first treated with the organic solvent solution of the sulphonate and the sulphonate thereafter converted to an insoluble form by contacting the textiles with an alkali, suitably in an organic solvent.

The direct deposition of the sulphonated polymethylstyrenes as such upon the surface and in the interstices of the finished cloth or fabric may be desirable in some cases and may be accomplished in the following manner.

A readily decomposible salt of the desired sulphonated polymethylstyrene, as for example the ammonia salt, is prepared. The salt is dissolved or dispersed in water or some other solvent, and dispersed on the cloth or fabric in the usual manner. The impregnated cloth or fabric then is heated or otherwise treated to decompose the ammonia, or other salt, and subsequently volatilize it, leaving the sulphonated polymethylstyrene deposited directly upon the surface of the fibres. By the application of heat, or other treating processes, the sulphonated polymethylstyrene can be induced to react with, or become more firmly affixed to, the finished fabric.

The sulphonated polymethylstyrenes also may be deposited directly upon the surface of the finished fabric from an aqueous or other solution without going through the intermediate formation of the ammonia salt, or other readily decomposible salt.

Each such process has certain advantages which renders it of value for certain specific applications.

As further illustrative of the many uses for sulphonated derivatives of polymethylstyrenes may be mentioned the following.

Alkali metal salts of the acid sulphonates of polymerized paramethylstyrene, such as obtained in Example I above, have been found to be excellent detergents, wetting agents and penetrants.

The chlorosulphonic acid derivatives of polymerized paramethylstyrene such as obtained in Example III above have been found to form a very pronounced soapy lather in water. Such products are also valuable for use as detergents, wetting agents, foaming agents and penetrants.

These latter products and their alkali metal salts have also been found to constitute excellent protective colloids.

The neutral sodium salts of sulphonated polymerized paramethylstyrene such as prepared in accordance with Example II above have been found to possess excellent sizing properties, in solution form, for threads of celanese silk and cotton. The compound may be readily removed from the thread by the application of either cold or lukewarm water.

Illustrative of such uses for these novel sulphonated polymethylstyrenes, the following examples are given.

Ten parts of sulphonated polymethylstyrene was dissolved in ninety parts of hot water to form a clear solution. This solution was just neutralized with an aqueous solution of sodium hydroxide, resulting in the production of a clear 8% aqueous solution of sodium polymethylstyrene sulphonate.

Celanese threads were immersed in this solution, after which they were withdrawn and the excess size mechanically removed. The sized threads were then permitted to dry at room temperature.

The degree of rigidity imparted to the sized thread was then determined in the following manner: One end of the thread was held in a suitable device, while the other end was permitted to project for a short distance beyond the supporting device. One end of an accurately counterbalanced wire bridge supporting a paper vane was placed on the unsupported section of the sized thread, the other end of the wire bridge being engaged by a suitable hinged joint.

A small jet was placed immediately above the paper vane on the wire bridge. A stream of nitrogen, under steadily increasing pressure, was then impinged upon the paper vane until the sized thread failed to support the wire bridge. The pressure required to accomplish this was then recorded.

Similar tests were then made with various commercial sizing materials. It was found that celanese threads sized with sodium polymethylstyrene sulphonate were definitely superior in mechanical strength, as measured by their resistance to bending, to the corresponding threads sized with the majority of the sizing materials commercially available, and equal in mechanical strength to any of the better sizing materials tested.

After testing the celanese threads which had been sized with sodium polymethylstyrene sulphonate, the sizing was completely stripped from the threads by gentle washing with lukewarm water. As the majority of the sizing materials available at the present time can only be stripped by prolonged immersion in a warm solution of sodium hydroxide, which has a tendency to weaken the celanese threads, the ease with which the sodium polymethylstyrene sulphonate size can be removed is of the utmost commercial importance.

*Example IV*

Cotton threads were sized with sodium polymethylstyrene sulphonate, after which the sized threads were tested by the methods described in the preceding example. The sized threads were found to be definitely superior in mechanical strength to the corresponding threads which had been sized with the majority of the sizing materials previously known, and equal in this respect to any of the better sizing materials known. In addition, the sodium polymethylstyrene sulphonate size was definitely superior to all other sizing materials in respect to the ease with which it could be stripped from the sized threads.

Many other uses of the sulphonated derivatives of polymerized ortho, meta and para methyl styrenes and copolymers of the foregoing will be recognized by those skilled in the art upon becoming familiar with this invention. The ease with which various properties of these derivatives may be controlled, makes them adaptable to many industrial applications.

In the specification and in the claims, the following terms have the following meanings.

The terms "polymethylstyrene," "polymerized methyl styrene," and "methyl styrene polymers" are intended to embrace all polymers, both high and low molecular weight, of ortho, meta and para methylstyrenes and copolymers thereof.

The terms "methylstyrene" and "methyl-substituted styrene" are intended to embrace styrenes containing substituted methyl groups in the ortho, meta, and para positions on the aromatic nucleus.

The terms "sulphonate," "sulphonated derivatives" and "sulphonated polymer" are intended to embrace polymerized methyl styrene containing $SO_3H$ radicals or the salts or other derivatives of these radicals, and are likewise intended to embrace such compounds in which from one to four of these radicals have been substituted upon one or more aromatic nucleus. These terms will thus be seen to generically embrace alkali sulphonates, alkaline earth sulphonates and halogenated sulphonates as well as acid sulphonates.

The term "sulphonating agent" is intended to embrace all reagents capable of introducing one or more sulphonate radicals into a polymethylstyrene molecule.

The term "base" is intended to embrace any chemical compound whether inorganic or organic which has a basic reaction.

While representative compounds, and procedures for the preparation of these compounds have been particularly described, it is to be understood that these are by way of illustration only. Therefore, changes, omissions, additions, substitutions, and/or modifications may be made within the scope of the claims without departing from the spirit of the invention which is intended to be limited only as required by the prior art.

With respect to uses of my new products reference is made to my copending application Serial Number 412,457, filed September 26, 1941.

I claim:

1. As a new product, a sulphonate of polymerized methyl styrene.

2. As a new product, an acid sulphonate of polymerized methyl styrene.

3. As a new product, a sulphuric acid derivative of the polymerized methyl styrene.

4. As a new product, a chlorsulphonic acid derivatives of polymerized methyl styrene.

5. As a new product, a metal sulphonate of polymerized methyl styrene.

6. As a new product, an alkali metal salt of sulphonated polymerized methyl styrene.

7. As a new product, an alkaline earth metal salt of sulphonated polymerized methyl styrene.

8. As a new product, an organic base salt of sulphonated polymerized methyl styrene.

9. As a new product, a sulphonate of polymerized paramethylstyrene.

10. As a new product, a sulphonate of polymerized metamethylstyrene.

11. As a new product, a sulphonate of polymerized orthomethylstyrene.

12. As a new product, a monosulphonate of polymerized methylstyrene.

13. As a new product, a polysulphonate of polymerized methylstyrene.

14. A process for the preparation of a sulphonated derivative of polymerized methyl styrene comprising reacting polymerized methyl styrene with a sulphonating agent.

15. A process for the preparation of a sulphonated derivative of polymerized methyl styrene comprising introducing into a polymerized methyl styrene molecule at least one sulphonic radical by means of a sulphonating agent.

16. A process for the preparation of a sulphonated derivative of polymerized methyl styrene comprising reacting a base with the reaction product of polymerized methyl styrene and a sulphonating agent.

17. A process for the preparation of a sulphonated derivative of a polymer derived from an aromatic light oil which comprises separating a methyl styrene fraction from said light oil, subjecting said fraction to polymerizing conditions such that a polymer is formed, and reacting said polymer with a sulphonating agent to form a sulphonate of said polymer.

18. A process for the preparation of a sulphonated derivative of a polymer derived from an aromatic light oil which comprises separating a paramethylstyrene fraction from said light oil; subjecting said fraction to polymerizing conditions such that a polymer is formed; and reacting said polymer with a sulphonating agent selected from the group consisting of sulphuric acid, fuming sulphuric acid and chlorosulphonic acid under conditions favorable to the introduction of at least one sulphonic radical per polymer molecule.

FRANK J. SODAY.